United States Patent
Liu et al.

(10) Patent No.: US 11,513,679 B2
(45) Date of Patent: Nov. 29, 2022

(54) METHOD AND APPARATUS FOR PROCESSING TOUCH SIGNAL, AND MEDIUM

(71) Applicant: BEIJING XIAOMI MOBILE SOFTWARE CO., LTD., Beijing (CN)

(72) Inventors: Lijun Liu, Beijing (CN); Mintao Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/699,647

(22) Filed: Nov. 30, 2019

(65) Prior Publication Data

US 2021/0004151 A1 Jan. 7, 2021

(30) Foreign Application Priority Data

Jul. 4, 2019 (CN) .......................... 201910599976.8

(51) Int. Cl.
| | |
|---|---|
| *G06F 3/04883* | (2022.01) |
| *G06F 9/54* | (2006.01) |
| *G06F 3/0488* | (2022.01) |
| *G06F 9/48* | (2006.01) |

(52) U.S. Cl.
CPC ........ *G06F 3/04883* (2013.01); *G06F 3/0488* (2013.01); *G06F 9/4806* (2013.01); *G06F 9/542* (2013.01)

(58) Field of Classification Search
None
See application file for complete search history.

(56) References Cited

U.S. PATENT DOCUMENTS

| | | | | |
|---|---|---|---|---|
| 6,377,288 | B1* | 4/2002 | Moran ................ | G06F 3/04883 345/442 |
| 2009/0199130 | A1* | 8/2009 | Tsern ...................... | G06F 1/163 715/810 |
| 2010/0110025 | A1* | 5/2010 | Lim ..................... | G06F 3/03547 345/173 |
| 2012/0284432 | A1* | 11/2012 | Chen ..................... | G06F 3/0607 710/36 |
| 2013/0002567 | A1 | 1/2013 | Lee et al. | |

(Continued)

FOREIGN PATENT DOCUMENTS

| | | |
|---|---|---|
| CN | 102135858 A | 7/2011 |
| CN | 102902469 A | 1/2013 |

(Continued)

OTHER PUBLICATIONS

Extended European Search Report in Application No. 20152138.2, dated Jul. 27, 2020.

(Continued)

*Primary Examiner* — Ryan F Pitaro
(74) *Attorney, Agent, or Firm* — Syncoda LLC; Feng Ma

(57) ABSTRACT

A method for processing a touch signal includes: detecting, through an event dispatch process, a full-screen gesture touch signal, determining whether the full-screen gesture touch signal conforms to a full-screen gesture trajectory determination rule; and sending, based on a result of the determining, the full-screen gesture touch signal or a part of events of the full-screen gesture touch signal to a gesture processing process or an application processing process.

14 Claims, 4 Drawing Sheets

(56) References Cited

U.S. PATENT DOCUMENTS

| | | | |
|---|---|---|---|
| 2013/0038552 A1* | 2/2013 | Chan | G06F 3/04883 345/173 |
| 2013/0135221 A1 | 5/2013 | Ainslie et al. | |
| 2013/0222272 A1 | 8/2013 | Martin, Jr. | |
| 2013/0283204 A1* | 10/2013 | Pasquero | G06F 3/0484 715/784 |
| 2014/0104195 A1 | 4/2014 | Davidson | |
| 2015/0343312 A1* | 12/2015 | Navarro | A63F 13/5372 463/31 |
| 2015/0346944 A1* | 12/2015 | Zhou | G06F 3/0482 715/765 |
| 2017/0039167 A1 | 2/2017 | Walker et al. | |
| 2017/0123590 A1 | 5/2017 | Han et al. | |
| 2018/0088792 A1* | 3/2018 | Klein | G06F 3/04883 |
| 2020/0057555 A1* | 2/2020 | Walkin | G06F 3/0482 |
| 2020/0272523 A1* | 8/2020 | Gauthier | G06F 9/5072 |

FOREIGN PATENT DOCUMENTS

| | | |
|---|---|---|
| CN | 102902469 B | 8/2015 |
| CN | 104932744 A | 9/2015 |
| CN | 106445370 A | 2/2017 |
| CN | 107506087 A | 12/2017 |
| CN | 108459794 A | 8/2018 |
| JP | 2017528776 A | 9/2017 |
| KR | 20130012543 A | 2/2013 |
| KR | 101341737 B1 | 12/2013 |
| KR | 20160014983 A | 2/2016 |
| KR | 20170012422 A | 2/2017 |
| RU | 2568775 C2 | 11/2015 |

OTHER PUBLICATIONS

RU First Office Action in Application No. 2019143081, dated Jul. 30, 2020.
KR Office Action in Application No. 9-5-2020-073487276, dated Oct. 26, 2020.
Korea Notice of Allowance in Application No. 10-2019-7033549, dated Apr. 30, 2021.
ISA State Intellectual Property Office of the People's Republic of China, International Search Report dated Mar. 27, 2020 in Application No. PCT/CN2019/111321.
CN 1st Office Action in Application No. 201910599976.8, dated Aug. 25, 2021.
India first office action in Application No. 201927049948, dated Feb. 9, 2022.

* cited by examiner

METHOD AND APPARATUS FOR PROCESSING TOUCH SIGNAL, AND MEDIUM

CROSS-REFERENCE TO RELATED APPLICATION

This application claims priority to Chinese Patent Application No. 201910599976.8 filed on Jul. 4, 2019, the disclosure of which is hereby incorporated by reference in its entirety.

BACKGROUND

As full-screen mobile terminals are widely used, full-screen gestures are supported within gesture input regions of display screens for convenient operations, so as to improve user experience.

SUMMARY

The present disclosure generally relates to the field of mobile terminal data processing technologies, and more specifically to a method and an apparatus for processing a touch signal, and a medium.

According to an aspect of embodiments of the present disclosure, there is provided a method for processing a touch signal, which includes:

detecting, through an event dispatch process, a full-screen gesture touch signal, determining whether the full-screen gesture touch signal conforms to a full-screen gesture trajectory determination rule; and sending, based on a result of the determining, the full-screen gesture touch signal or a part of events of the full-screen gesture touch signal to a gesture processing process or an application processing process.

According to another aspect of the embodiments of the present disclosure, there is provided an apparatus for processing a touch signal, which includes an event dispatch process processing module, wherein the event dispatch process processing module includes:

a detecting module, configured to detect a full-screen gesture touch signal;

a determining module, configured to determine whether the full-screen gesture touch signal conforms to a full-screen gesture trajectory determination rule; and a processing module, configured to send, based on a result as determined, the full-screen gesture touch signal or a part of events of the full-screen gesture touch signal to a gesture processing process or an application processing process.

According to still another aspect of the embodiments of the present disclosure, there is provided an apparatus for processing a touch signal, which includes:

a processor, and a memory configured to store instructions executable by the processor.

The processor is configured to:

detect, through an event dispatch process, a full-screen gesture touch signal, determine whether the full-screen gesture touch signal conforms to a full-screen gesture trajectory determination rule; and send, based on a result as determined, the full-screen gesture touch signal or a part of events of the full-screen gesture touch signal to a gesture processing process or an application processing process.

According to an aspect of the embodiments of the present disclosure, there is provided a non-transitory computer-readable storage medium, wherein instructions in the storage medium are executed by a processor of a mobile terminal such that the mobile terminal can execute a method for processing a touch signal, the method including:

detecting, through an event dispatch process, a full-screen gesture touch signal, determining whether the full-screen gesture touch signal conforms to a full-screen gesture trajectory determination rule; and sending, based on a result of the determining, the full-screen gesture touch signal or a part of events of the full-screen gesture touch signal to a gesture processing process or an application processing process.

It is to be understood that the above general description and the detailed description below are merely exemplary and explanatory, and do not limit the present disclosure.

BRIEF DESCRIPTION OF THE DRAWINGS

The accompanying drawings herein are incorporated in and constitute a part of this disclosure, illustrate embodiments conforming to the present disclosure and, together with the specification, serve to explain the principles of the present disclosure.

DETAILED DESCRIPTION

Reference will now be made in detail to some embodiments, examples of which are illustrated in the accompanying drawings. When accompanying figures are mentioned in the following descriptions, the same numbers in different drawings represent the same or similar elements, unless otherwise represented. The implementations set forth in the following some embodiments do not represent all implementations consistent with the present disclosure. Instead, they are merely examples of apparatuses and methods consistent with some aspects related to the present disclosure as recited in the appended claims.

When maintaining full-screen gesture processing procedures, the following processing manners can be adopted according to some embodiments of the present disclosure: after receiving a touch signal, an event dispatch process sends the touch signal to a gesture processing process, such that the gesture processing process determines whether this touch signal conforms to a full-screen gesture trajectory determination rule. If this touch signal does not conform to the full-screen gesture trajectory determination rule, all events contained in this touch signal are sent to the event dispatch process, which will send the received events to an application processing process. In this process, the event dispatch process may also dispatch a touch signal for an application to the application processing process. The above processing manner easily leads to simultaneous response of the gesture processing process and the application processing process, which causes frequent screen interface mis-switching, and thus having a negative effect on user experience.

Figure 1:
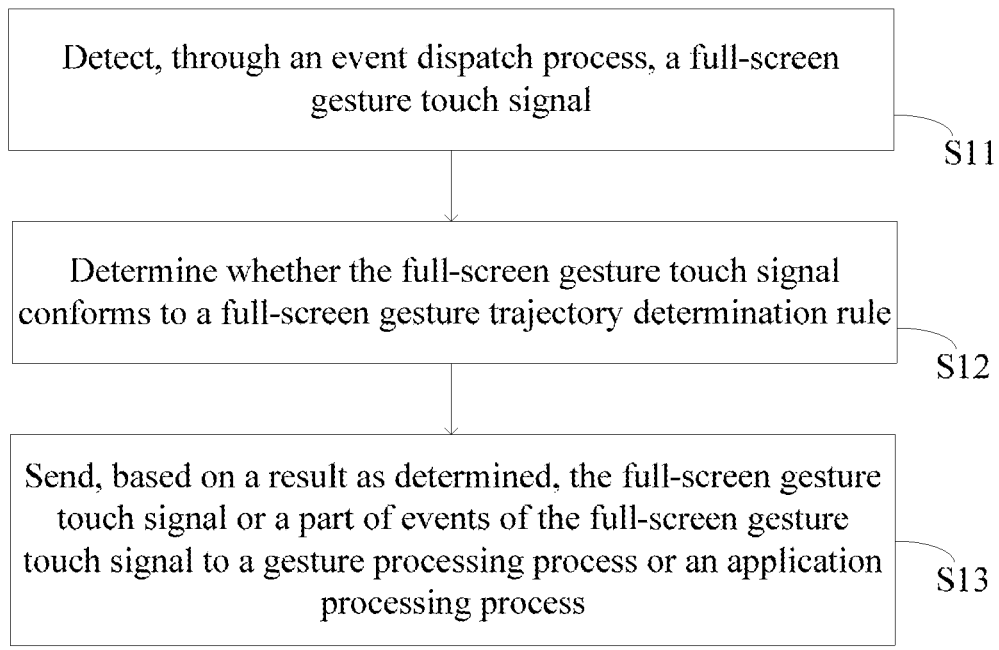
FIG. 1 illustrates a flowchart of a method for processing a touch signal according to an exemplary embodiment.

Various embodiments can provide a method for processing a touch signal through creative labor. As shown in FIG. 1, the method for processing a touch signal includes following steps.

In step S11, a full-screen gesture touch signal is detected by an event dispatch process.

In step S12, it is determined whether the full-screen gesture touch signal conforms to a full-screen gesture trajectory determination rule.

In step S13, the full-screen gesture touch signal or a part of events of the full-screen gesture touch signal is sent to a gesture processing process or an application processing process based on a result as determined.

The step S13 of sending the full-screen gesture touch signal or a part of events of the full-screen gesture touch signal to a gesture processing process or an application processing process based on a result as determined includes:

sending, when the result indicates that the full-screen gesture touch signal conforms to the full-screen gesture trajectory determination rule, the full-screen gesture touch signal or the part of events of the full-screen gesture touch signal to the gesture processing process; and sending, when the result indicates that the full-screen gesture touch signal does not conform to the full-screen gesture trajectory determination rule, the full-screen gesture touch signal or the part of events of the full-screen gesture touch signal to the application processing process.

The event dispatch process is positioned at the bottom layer of a system, for example, at a system server layer of the system. The application processing process is positioned at a business layer of the system and is used to process applications (such as setting applications, map applications, desktop applications, interface interactive applications, etc.). Positioned at the business layer of the system, the gesture processing process may be maintained by a certain application in the business layer, or the gesture processing process may be a separate business layer process.

According to the method, the application process is enabled to receive a complete sequence of touch operations that conforms to a processing logic, thereby effectively preventing the gesture processing process and the application processing process from simultaneously responding, such that interface switching is ensured to be stable and smooth when a user operates in a gesture input region.

Each gesture input region corresponds to a full-screen gesture trajectory determination rule. This full-screen gesture trajectory determination rule includes trajectory determination rules of one or more gestures, and different gestures have different functions. For example, the function of one gesture is to directly return to the home page, whereas the function of another gesture is to return to the previous path of the current interface path. Specifically, the step S11 of detecting a full-screen gesture touch signal by an event dispatch process includes: detecting, by the event dispatch process, a full-screen gesture touch signal within a preset screen region. The step S12 of determining whether the full-screen gesture touch signal conforms to a full-screen gesture trajectory determination rule includes: determining whether the full-screen gesture touch signal conforms to the full-screen gesture trajectory determination rule corresponding to the preset screen region.

Figure 2:
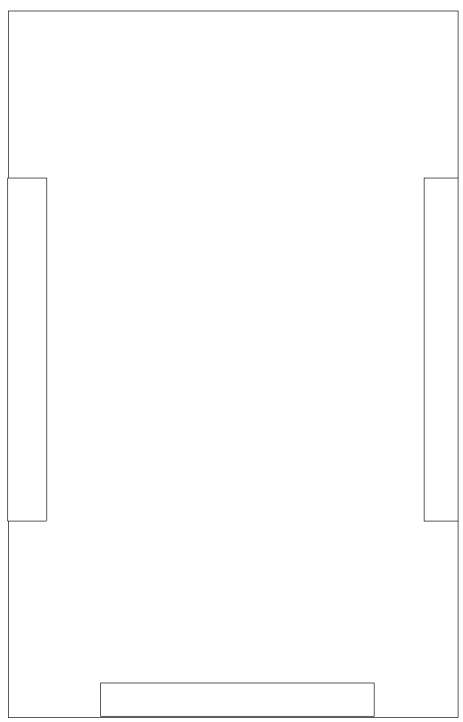
FIG. 2 is a schematic diagram showing a location where a gesture input region is on a display screen of a mobile terminal according to an exemplary embodiment.

FIG. 2 is a schematic diagram showing a location where a gesture input region is on a display screen of a mobile terminal. The full-screen gesture input region generally is at the edge of the display screen, such as the left edge, the right edge, or the bottom edge.

The full-screen gesture includes a series of coherent operation events. For example, the full-screen gesture includes at least one of a finger press-down event or a finger movement event. Alternatively, the full-screen gesture includes at least one of the finger press-down event or the finger movement event and further includes at least one of a finger pause event or a finger lift event.

Reference is made below based on a specific embodiment.

Specific Embodiments

The right edge region of the screen of the mobile terminal is the gesture input region, and the full-screen gesture trajectory determination rule indicates to return to the home screen page when a sliding touch signal is inputted into the gesture input region.

When the mobile terminal is running a game application, the right region of the current game interface including the gesture input region is an operation region for returning to game home interface. When a user performs a double-click operation in the right region, the game application will be switched from the current game to the game home interface.

The user inputs a sliding touch signal in the gesture input region. After detecting this touch signal in the gesture input region, the event dispatch process determines that this touch signal conforms to the full-screen gesture trajectory determination rule, and sends this touch signal to the gesture processing process. After making an analysis, the gesture processing process controls the current interface to return to the home screen page.

Alternatively, the user inputs a sliding touch signal in the gesture input region, wherein this sliding signal includes one finger press-down event and five finger movement events. When it is determined that this touch signal conforms to the full-screen gesture trajectory determination rule, one finger press-down event and the first three finger movement events of this touch signal are sent to the gesture processing process. After making an analysis, the gesture processing process controls the current interface to return to the home screen page.

The user inputs a double-click touch signal in the gesture input region. After detecting this touch signal in the gesture input region, the event dispatch process determines that this touch signal does not conform to the full-screen gesture trajectory determination rule, and sends this touch signal to the application processing process. After making an analysis, the gesture processing process controls the current interface to return to the game home interface.

Alternatively, the user inputs a double-click touch signal in the gesture input region. After detecting this touch signal in the gesture input region, the event dispatch process determines that this touch signal does not conform to the full-screen gesture trajectory determination rule, and sends a part of events of this touch signal to the application processing process. That is, one single-click event of this touch signal is sent to the application processing process. After making an analysis, the gesture processing process maintains the current interface unchanged.

Figure 3:
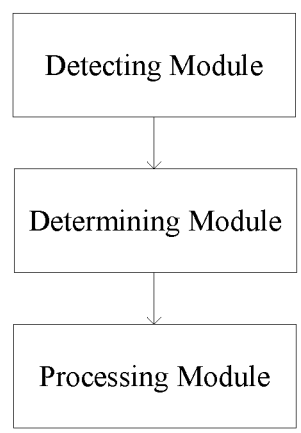
FIG. 3 illustrates a block diagram of an apparatus for processing a touch signal according to an exemplary embodiment.

FIG. 3 illustrates a block diagram of an apparatus for processing a touch signal according to an exemplary embodiment. The apparatus includes an event dispatch process processing module, wherein the event dispatch process processing module includes:

a detecting module, configured to detect a full-screen gesture touch signal;

a determining module, configured to determine whether the full-screen gesture touch signal conforms to a full-screen gesture trajectory determination rule; and a processing module, configured to send to a gesture processing process or an application processing process based on a determination result, the full-screen gesture touch signal or a part of events of the full-screen gesture touch signal.

The processing module includes a first sending module and a second sending module.

The first sending module is configured to send, when the result indicates that the full-screen gesture touch signal conforms to the full-screen gesture trajectory determination rule, the full-screen gesture touch signal or the part of events of the full-screen gesture touch signal to the gesture processing process.

The second sending module is configured to send, when the result indicates that the full-screen gesture touch signal does not conform to the full-screen gesture trajectory determination rule, the full-screen gesture touch signal or the part of events of the full-screen gesture touch signal to the application processing process.

Specifically, the detecting module is further configured to detect the full-screen gesture touch signal by detecting a full-screen gesture touch signal within a preset screen region.

The determining module is further configured to determine whether the full-screen gesture touch signal conforms to the full-screen gesture trajectory determination rule by determining whether the full-screen gesture touch signal conforms to the full-screen gesture trajectory determination rule corresponding to the preset screen region.

The full-screen gesture includes at least one of a finger press-down event or a finger movement event. Alternatively, the full-screen gesture includes at least one of the finger press-down event or the finger movement event and further includes at least one of a finger pause event or a finger lift event.

Figure 4:
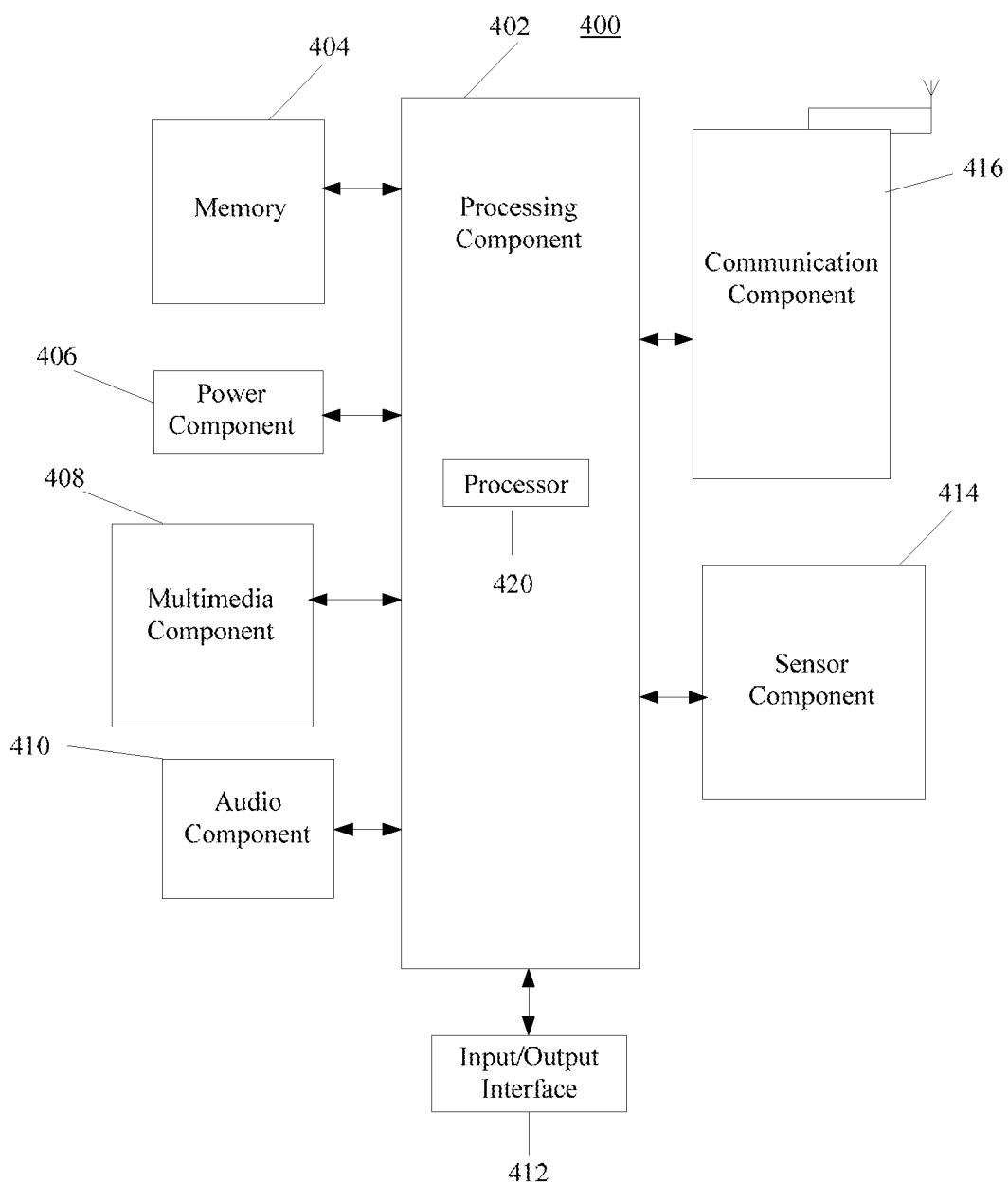
FIG. 4 illustrates a block diagram of an apparatus for processing a touch signal according to another exemplary embodiment.

FIG. 4 illustrates a block diagram of an apparatus 400 for determining a performance parameter of a speech enhancement algorithm according to an exemplary embodiment. For example, the apparatus 400 may be a mobile phone, a computer, a digital broadcast terminal, a message transceiver device, a game console, a tablet device, a medical equipment, a fitness equipment, a personal digital assistant, and the like.

Referring to FIG. 4, the apparatus 400 may include one or more of the following components: a processing component 402, a memory 404, a power component 406, a multimedia component 408, an audio component 410, an input/output (I/O) interface 412, a sensor component 414, and a communication component 416.

The processing component 402 typically controls overall operations of the apparatus 400, such as the operations associated with display, telephone calls, data communications, camera operations, and recording operations. The processing component 402 may include one or more processors 420 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 405 and the processing component 402.

The memory 404 is configured to store various types of data to support the operation of the apparatus 400. Examples of such data may include instructions for any applications or methods operated on the apparatus 400, contact data, phone-book data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 may provide power to various components of the apparatus 400. The power component 406 may include a power management system, one or more power sources, and any other components associated with the generation, management, and distribution of power in the apparatus 400.

The multimedia component 405 includes a screen providing an output interface between the apparatus 400 and the user. In some embodiments, the screen may include a liquid crystal display (LCD) and a touch panel (TP). In some embodiments, an organic light-emitting diode (OLED) display or other types of display screens can be adopted.

If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 405 may include a front camera and/or a rear camera. The front camera and/or the rear camera may receive an external multimedia datum while the apparatus 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone ("MIC") configured to receive an external audio signal when the apparatus 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface between the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the apparatus 400. For example, the sensor component 414 may detect the on/off state of the apparatus 400, relative locations of components, for example, the components are the displayer and keypads of the apparatus 400. The sensor component 414 may further sense the position change of a component of the apparatus 400 or the position change of the apparatus 400, whether the touch exists between the user and the apparatus 400, the direction or acceleration/deceleration of the apparatus 400, and temperature change of the apparatus 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate communication, wired or wirelessly, between the apparatus 400 and other devices. The apparatus 400 can access a wireless network based on a communication standard, such as WiFi, 2G, or 3G, or a combination thereof. In an exemplary embodiment, the communication component 416 receives by means of a broadcast channel the broadcast signal or broadcast-related information from external broadcast management systems. In an exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 404, executable by the processor 420 in the apparatus 400, for performing the above-described methods. For example, the non-transitory computer-readable storage medium may be a ROM, a RAM, a CD-ROM, a magnetic tape, a floppy disc, an optical data storage device, and the like.

In one or more embodiments, the sending, based on a result of the determining, the full-screen gesture touch signal or a part of events of the full-screen gesture touch signal to a gesture processing process or an application processing process includes: sending, when the result indicates that the full-screen gesture touch signal conforms to the full-screen gesture trajectory determination rule, the full-screen gesture touch signal or the part of events of the full-screen gesture touch signal to the gesture processing process; and sending, when the result indicates that the full-screen gesture touch signal does not conform to the full-screen gesture trajectory determination rule, the full-screen gesture touch signal or the part of events of the full-screen gesture touch signal to the application processing process.

In one or more embodiments, the detecting, through an event dispatch process, a full-screen gesture touch signal includes: detecting, through the event dispatch process, the full-screen gesture touch signal within a preset screen region; and the determining whether the full-screen gesture touch signal conforms to a full-screen gesture trajectory determination rule includes: determining whether the full-screen gesture touch signal conforms to the full-screen gesture trajectory determination rule corresponding to the preset screen region.

In one or more embodiments, the full-screen gesture includes at least one of a finger press-down event or a finger movement event; or the full-screen gesture includes at least one of the finger press-down event or the finger movement event, and further includes at least one of a finger pause event or a finger lift event.

In one or more embodiments, the processing module includes a first sending module and a second sending module; the first sending module is configured to send, when the result indicates that the full-screen gesture touch signal conforms to the full-screen gesture trajectory determination rule, the full-screen gesture touch signal or the part of events of the full-screen gesture touch signal to the gesture processing process; and the second sending module is configured to send, when the result indicates that the full-screen gesture touch signal does not conform to the full-screen gesture trajectory determination rule, the full-screen gesture touch signal or the part of events of the full-screen gesture touch signal to the application processing process.

In one or more embodiments, the detecting module is further configured to detect the full-screen gesture touch signal by detecting the full-screen gesture touch signal within a preset screen region; and the determining module is further configured to determine whether the full-screen gesture touch signal conforms to the full-screen gesture trajectory determination rule by determining whether the full-screen gesture touch signal conforms to the full-screen gesture trajectory determination rule corresponding to the preset screen region.

In one or more embodiments, the full-screen gesture includes at least one of a finger press-down event or a finger movement event; or the full-screen gesture includes at least one of the finger press-down event or the finger movement event, and further includes at least one of a finger pause event or a finger lift event.

Various embodiments of the present disclosure can include one or more of the following advantages. The application process is enabled to receive a complete sequence of touch operations that conforms to a processing logic, thereby effectively preventing the gesture processing process and the application processing process from simultaneously responding, such that interface switching is ensured to be stable and smooth when a user operates in a gesture input region.

The various circuits, device components, modules, units, blocks, or portions may have modular configurations, or are composed of discrete components, but nonetheless can be referred to as "units," "modules," or "portions" in general. In other words, the "circuits," "components," "modules," "blocks," "portions," or "units" referred to herein may or may not be in modular forms.

Those of ordinary skill in the art will understand that the above described modules/units can each be implemented by hardware, or software, or a combination of hardware and software. Those of ordinary skill in the art will also understand that multiple ones of the above described modules/units may be combined as one module/unit, and each of the above described modules/units may be further divided into a plurality of sub-modules/sub-units.

In the present disclosure, it is to be understood that the terms "lower," "upper," "center," "longitudinal," "transverse," "length," "width," "thickness," "upper," "lower," "front," "back," "left," "right," "vertical," "horizontal," "top," "bottom," "inside," "outside," "clockwise," "counterclockwise," "axial," "radial," "circumferential," "column," "row," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the present disclosure, a first element being "on," "over," or "below" a second element may indicate direct contact between the first and second elements, without contact, or indirect through an intermediate medium, unless otherwise explicitly stated and defined.

Moreover, a first element being "above," "over," or "at an upper surface of" a second element may indicate that the first element is directly above the second element, or merely that the first element is at a level higher than the second element. The first element "below," "underneath," or "at a lower surface of" the second element may indicate that the first element is directly below the second element, or merely that the first element is at a level lower than the second feature. The first and second elements may or may not be in contact with each other.

In the description of the present disclosure, the terms "one embodiment," "some embodiments," "example," "specific example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

In some embodiments, the control and/or interface software or app can be provided in a form of a non-transitory computer-readable storage medium having instructions stored thereon is further provided. For example, the non-transitory computer-readable storage medium may be a Read-Only Memory (ROM), a Random-Access Memory (RAM), a Compact Disc Read-Only Memory (CD-ROM), a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures. For example, the devices can be controlled remotely through the Internet, on a smart phone, a tablet computer or other types of computers, with a web-based graphic user interface (GUI).

A computer program (also known as a program, software, software application, app, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode) display, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In an example, a user can speak commands to the audio processing device, to perform various operations.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features may be described above as acting in certain combinations and even initially claimed as such, one or more features from a claimed combination can in some cases be excised from the combination, and the claimed combination may be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for processing a touch signal, comprising:
detecting, through an event dispatch process, a full-screen gesture touch signal;
determining, through the event dispatch process, whether the full-screen gesture touch signal conforms to a full-screen gesture trajectory determination rule; and
sending, through the event dispatch process based on a result of the determining, a part of events of the full-screen gesture touch signal to a gesture processing process or an application processing process, wherein
the sending, through the event dispatch process based on a result of the determining, a part of events of the full-screen gesture touch signal to a gesture processing process or an application processing process comprises:
sending, through the event dispatch process when the result indicates that the full-screen gesture touch signal conforms to the full-screen gesture trajectory determination rule, the part of events of the full-screen gesture touch signal to the gesture processing process; and sending, through the event dispatch process when the result indicates that the full-screen gesture touch signal does not conform to the full-screen gesture trajectory determination rule, the part of events of the full-screen gesture touch signal to the application processing process;

wherein the event dispatch process is positioned at a bottom layer of a system, wherein the bottom layer comprises a system server layer;

the gesture processing process is positioned at a business layer of the system, maintained by an application in the business layer, or is a separate business layer process;

the application processing process is positioned at the business layer of the system; and the determining of whether the full-screen gesture touch signal conforms to the full-screen gesture trajectory determination rule, and the part of events of the full-screen gesture touch signal, are processed at different layers of the system.

2. The method for processing a touch signal according to claim 1, wherein the detecting, through an event dispatch process, a full-screen gesture touch signal comprises: detecting, through the event dispatch process, the full-screen gesture touch signal within a preset screen region; and the determining whether the full-screen gesture touch signal conforms to a full-screen gesture trajectory determination rule comprises: determining whether the full-screen gesture touch signal conforms to the full-screen gesture trajectory determination rule corresponding to the preset screen region.

3. The method for processing a touch signal according to claim 1, wherein the full-screen gesture comprises at least one of a finger press-down event or a finger movement event; or the full-screen gesture comprises at least one of the finger press-down event or the finger movement event, and further comprises at least one of a finger pause event or a finger lift event.

4. The method for processing a touch signal according to claim 1, wherein the full-screen gesture comprises at least one of a finger press-down event or a finger movement event; or the full-screen gesture comprises at least one of the finger press-down event or the finger movement event, and further comprises at least one of a finger pause event or a finger lift event.

5. An apparatus for processing a touch signal, comprising: a processor, and a memory, configured to store instructions executable by the processor;

wherein the processor is configured to:

detect, through an event dispatch process, a full-screen gesture touch signal;

determine, through the event dispatch process, whether the full-screen gesture touch signal conforms to a full-screen gesture trajectory determination rule; and send, through the event dispatch process based on a result as determined, a part of events of the full-screen gesture touch signal to a gesture processing process or an application processing process, wherein the processor is further configured to:

send, through the event dispatch process when the result indicates that the full-screen gesture touch signal conforms to the full-screen gesture trajectory determination rule, the part of events of the full-screen gesture touch signal to the gesture processing process; and send, through the event dispatch process when the result indicates that the full-screen gesture touch signal does not conform to the full-screen gesture trajectory determination rule, the part of events of the full-screen gesture touch signal to the application processing process;

wherein the event dispatch process is positioned at a bottom layer of a system, wherein the bottom layer comprises a system server layer;

the gesture processing process is positioned at a business layer of the system, maintained by an application in the business layer, or is a separate business layer process;

the application processing process is positioned at the business layer of the system; and the determining of whether the full-screen gesture touch signal conforms to the full-screen gesture trajectory determination rule, and the part of events of the full-screen gesture touch signal, are processed at different layers of the system.

6. The apparatus according to claim 5, wherein the processor is configured to:

detect, through the event dispatch process, the full-screen gesture touch signal within a preset screen region; and determine whether the full-screen gesture touch signal conforms to the full-screen gesture trajectory determination rule corresponding to the preset screen region.

7. The apparatus according to claim 5, wherein the full-screen gesture comprises at least one of a finger press-down event or a finger movement event; or the full-screen gesture comprises at least one of the finger press-down event or the finger movement event, and further comprises at least one of a finger pause event or a finger lift event.

8. The apparatus according to claim 5, wherein the full-screen gesture comprises at least one of a finger press-down event or a finger movement event; or the full-screen gesture comprises at least one of the finger press-down event or the finger movement event, and further comprises at least one of a finger pause event or a finger lift event.

9. A non-transitory computer-readable storage medium, wherein instructions in the storage medium, when being executed by a processor of a mobile terminal, cause the mobile terminal to execute a method for processing a touch signal, the method comprising:

detecting, through an event dispatch process, a full-screen gesture touch signal, determining, through the event dispatch process, whether the full-screen gesture touch signal conforms to a full-screen gesture trajectory determination rule; and sending, through the event dispatch process based on a result of the determining, a part of events of the full-screen gesture touch signal to a gesture processing process or an application processing process, wherein, the sending, through the event dispatch process based on a result of the determining, a part of events of the full-screen gesture touch signal to a gesture processing process or an application processing process comprises:

sending, through the event dispatch process when the result indicates that the full-screen gesture touch signal conforms to the full-screen gesture trajectory determination rule, the part of events of the full-screen gesture touch signal to the gesture processing process; and sending, through the event dispatch process when the result indicates that the full-screen gesture touch signal does not conform to the full-screen gesture trajectory determination rule, the part of events of the full-screen gesture touch signal to the application processing process;

wherein the event dispatch process is positioned at a bottom layer of a system, wherein the bottom layer comprises a system server layer;

the gesture processing process is positioned at a business layer of the system, maintained by an application in the business layer, or is a separate business layer process;

the application processing process is positioned at the business layer of the system; and the determining of whether the full-screen gesture touch signal conforms to the full-screen gesture trajectory determination rule, and the part of events of the full-screen gesture touch signal, are processed at different layers of the system.

10. The non-transitory computer-readable storage medium according to claim 9, wherein, the detecting, through an event dispatch process, a full-screen gesture touch signal comprises: detecting, through the event dispatch process, the full-screen gesture touch signal within a preset screen region; and the determining whether the full-screen gesture touch signal conforms to a full-screen gesture trajectory determination rule comprises: determining whether the full-screen gesture touch signal conforms to the full-screen gesture trajectory determination rule corresponding to the preset screen region.

11. The non-transitory computer-readable storage medium according to claim 9, wherein, the full-screen gesture comprises at least one of a finger press-down event or a finger movement event; or the full-screen gesture comprises at least one of the finger press-down event or the finger movement event, and further comprises at least one of a finger pause event or a finger lift event.

12. The non-transitory computer-readable storage medium according claim 9, wherein, the full-screen gesture comprises at least one of a finger press-down event or a finger movement event; or the full-screen gesture comprises at least one of the finger press-down event or the finger movement event, and further comprises at least one of a finger pause event or a finger lift event.

13. A mobile terminal implementing the method according to claim 1, comprising a touch screen configured to receive the touch signal.

14. The mobile terminal according to claim 13, wherein the apparatus is configured to receive a complete sequence of touch operations that conforms to a processing logic, thereby preventing the gesture processing process and the application processing process from simultaneously responding, such that interface switching is ensured to be stable and smooth when a user operates in a gesture input region.

* * * * *